United States Patent
Beaven et al.

(10) Patent No.: US 6,766,323 B2
(45) Date of Patent: Jul. 20, 2004

(54) SYSTEM, METHOD AND COMPUTER PROGRAM FOR APPLICATION SUPPORT IN A DATA PROCESSING SYSTEM

(75) Inventors: John Anthony Beaven, Eastleigh (GB); Logan Colby, Rochester, MN (US); Alexandra Mulholland, Winchester (GB); Ian Robinson, Southampton (GB)

(73) Assignee: International Business Machines Corporation, NY (US)

( * ) Notice: Subject to any disclaimer, the term of this patent is extended or adjusted under 35 U.S.C. 154(b) by 606 days.

(21) Appl. No.: 09/863,033

(22) Filed: May 22, 2001

(65) Prior Publication Data

US 2002/0178303 A1 Nov. 28, 2002

(51) Int. Cl.[7] .............................................. G06F 17/30
(52) U.S. Cl. ..................................... 707/10; 707/103 R
(58) Field of Search ...................... 707/10, 100, 103 R, 707/201; 709/201, 203, 217, 219, 225, 226; 717/103, 107, 108; 719/315, 328

(56) References Cited

U.S. PATENT DOCUMENTS 6,266,678 B1 * 7/2001 McDevitt et al. ........... 707/201
6,643,650 B1 * 11/2003 Slaughter et al. ............. 707/10

OTHER PUBLICATIONS

Brian Bennett et al., A distributed object oriented framework to offer transactional support for long running business processes, 2000, Middleware 2000, LNCS 1795, pp. 331–348.*
IBM et al., "Additional Structuring Mechanisms for OTS Specification," Jun. 2000, pp. 11–29.
"CORBA Object Transaction Service," Specification 1.1, Nov. 1997, pp. 10–1 through 10–90 (www.omg.org).

* cited by examiner

*Primary Examiner*—Diane D. Mizrahi
*Assistant Examiner*—Apu M Mofiz
(74) *Attorney, Agent, or Firm*—Steven W. Roth

(57) ABSTRACT

A data processing system comprising an object framework, and a plurality of components for supporting an application program utilizing the plurality of components. In the object framework, each of the plurality of components registers with the object framework. Then, in response to the registering, each of the plurality of components is associated with one of a plurality of context groups. Furthermore, each of the plurality of components creates an instance of itself. A first instance is associated with a first context group of a first respective component and a second instance is associated with a second context group of a second respective component. The first instance and the second instance operate independently of each other.

21 Claims, 11 Drawing Sheets

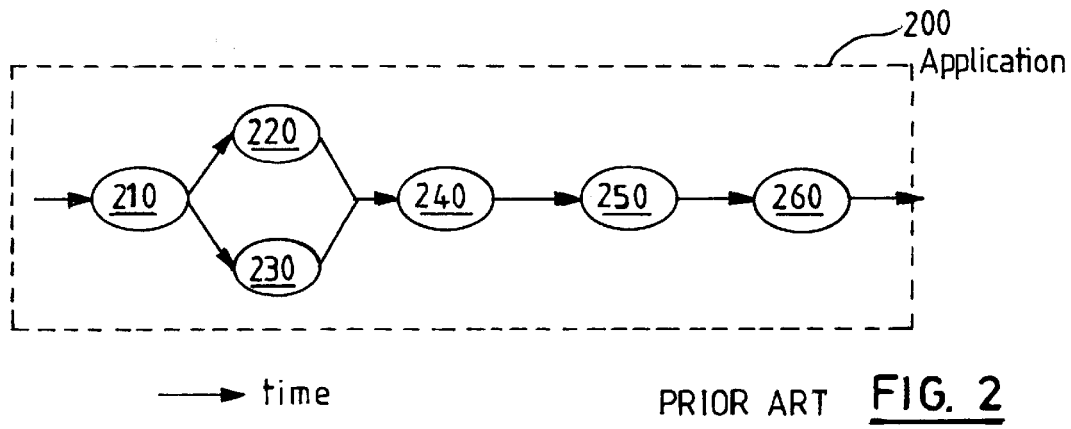
PRIOR ART FIG. 2
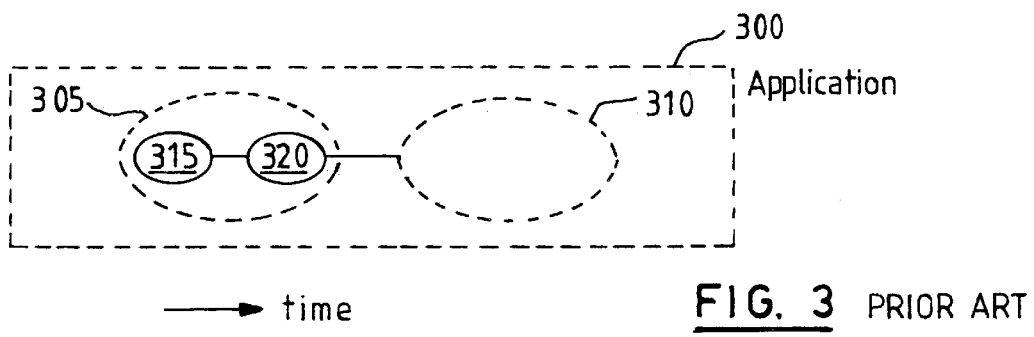
FIG. 3 PRIOR ART
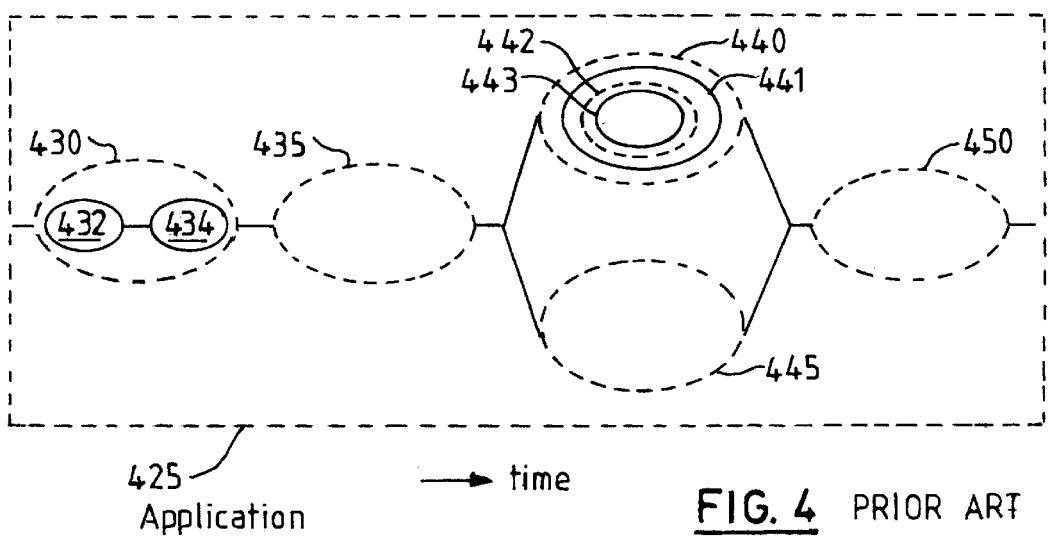
FIG. 4 PRIOR ART

SYSTEM, METHOD AND COMPUTER PROGRAM FOR APPLICATION SUPPORT IN A DATA PROCESSING SYSTEM

FIELD OF THE INVENTION

The present invention relates to application support in a data processing system.

BACKGROUND OF THE INVENTION

In distributed computing environments today, an increasingly large number of distributed applications, (that is to say user programs), are developed using a number of pre-existing applications and may run over an extended period of time. There is a need for systems to support these long-running applications for several reasons. One reason is that the long-running applications may be cumbersome, having complex structures and complex inter-relationships between the constituent applications. Additionally, because the applications often take a long time to complete they may remain inactive for long periods, whilst awaiting user interactions. These long-running applications may also require support for fault tolerance if machines fail or if services are moved or withdrawn.

An example of a distributed environment in which the long-running applications may run is shown in FIG. 1. A client/server data processing apparatus (100) is connected to other client/server data processing apparatus (120) and (130) via a network (110), which could be, for example, the Internet. The client/servers (100), (120) and (130) interact with each other, in the preferred embodiment, to carry out work, such as the processing of transactions (for example, transactions to update bank accounts). Client/server (100) has a processor (101) for executing programs that control the operation of the client/server (100). Client/server (100) also has a RAM volatile memory element (102), a non-volatile memory (103), and a network connector (104) for use in interfacing with the network (110) for communication with the other client/servers (120, 130).

Although each client/server in FIG. 1 is capable of sending and receiving messages from the network, whether they behave as a client and/or servers will depend on the programs that are used to control their operation. These programs can often run several processes on each client/server and these processes can be client or server processes. As a result it is possible for a client/server data processing apparatus to run several processes some of which behave as clients on the network and others that behave as servers on the network Referring to FIG. 2, a long-running application (200) may also be developed by utilising a number of individual transactions (210–260) running in series or in parallel. Transactions may be nested, whereby one transaction (a child) may be nested within another transaction (the parent). A top-level or root transaction is one that does not participate in nesting.

A transaction is a sequence of co-ordinated operations on system resources such that either all of the changes take effect or none of them does. The coordinated operations are typically changes made to data held in storage in the transaction processing system, system resources include databases, data tables, files, data records and so on. This characteristic of a transaction being accomplished as a whole, or not at all, is also known as atomicity (A). A transaction is also consistent (C) and this characteristic falls under the responsibility of the application. A transaction is also carried out in isolation (I) via locking mechanisms and is durable (D), in that the effects of a transaction must be evident and persistent. These characteristics are often known as the 'ACID' properties of an individual transaction.

Alternatively, a long-running application may comprise a number of individual activities at arbitrary points during its lifetime. Referring to FIG. 3, an application (300) may also comprise a combination of transactions (315,320) and activities (305,310). An activity is a single unit of distributed work that encompasses a particular piece of logic. An activity may have transactional or non-transactional behaviour during its lifetime and furthermore, a number of activities may be nested in a hierarchy, whereby a nested activity is a child of a parent activity.

Referring to FIG. 4, a series of connected activities (430,435,440,445,450) co-operating during an application's (425) lifetime is shown. A first activity (430) utilises two top-level transactions (432,434) during its execution. A second activity (440) comprises a transaction (441) and additionally comprises a nested activity (442). The nested activity (442) further comprises a transaction (443).

The structuring of applications as several short-duration transactions, rather than as a single top-level transaction has many advantages. One advantage is that the application acquires and uses resources for only the required duration, rather than for the entire duration of that application.

However, current problems with application structuring mechanisms include the fact that when an application comprising a number of individual transactions is executed, there may be a requirement for the application to possess some or all of the ACID properties not normally associated with the application. However, the process to enable the application to possess some or all of these ACID properties currently involves a manual overhead, whereby a programmer builds application-specific mechanisms.

Additionally, if failures or concurrent access occurs during the lifetime of the application, then the behaviour of the entire logical long-running application may not possess the ACID properties. Some form of application-specific compensation is therefore required to attempt to return the state of the system to application-specific consistency. For example, compensation transactions, which perform forward or backward recovery in order to obtain transactional semantics for the entire long-running application, may be required.

One solution to these problems is the low-level architecture, described by the OMG "Activity Service". Further information on the Activity Service can be found in the document "Additional Structuring Mechanisms for the OTS Specification", by IBM et al, 2000 available at http://www.omg.org. (IBM is a registered trademark of International Business Machines Corporation.)

The Activity Service is an object framework, upon which high-level services can be constructed to represent a variety of extended transaction models that may then support more complex transactional semantics than the simple ACID properties. Referring to FIG. 5, the Activity Service (500) provides support for high-level services (510,520) which can be built on top of it, whereby a high-level service (510) is utilised by an application. An OTS (530) may or may not be built on top of the Activity Service. An activity can therefore represent a particular high-level service or a transaction.

One main component of the Activity Service is a "context". A context, in terms of activities, is activity information associated with a specific thread. An activity performing an operation does so within its context and since activities can be nested, contexts can also be nested. Another component in the Activity Service is a "property", which represents application-specific information. A "Property Group" is a tuple-space of attribute-value pairs for specifying application-specific data.

The current activity service model provides useful functions for the high-level services, such as context demarcation and context propagation. The Activity Service provides general support for demarcation of work that can span multiple ACID transactions and for managing application-specified context data that is made globally available within that demarcation scope. It provides interfaces to specify demarcation boundaries for units of activity, and provides a distributed service context that is implicitly propagated, via an ORB, on remote requests.

Propagation will now be described in more detail with reference to FIG. 6. Multiple threads may be associated with a single activity at any one same time. The multiple threads may be present in the same execution environment or in multiple execution environments. In an Activity Service that is distributed across multiple nodes, activities are also distributed and are implicitly propagated with remote requests.

In FIG. 6, activity context (620) and property group data (610) are associated with an activity (600) on thread 1. At "A", an Activity Service Implementation in Process 1 collects the activity context (620) and property group data (610) into an Activity context data structure (640). Preferably, the Activity context data structure (640) is an OMG specified data structure. At "B", the data structure (640) is implicitly propagated to a remote environment across a network (630). Implicit propagation means that the Activity Service executes the propagation with no extra work performed by the application. At "C", an Activity Service Implementation in Process 2 unpacks the information in the data structure (640), in order for it to be utilised by Process 2 on thread 2.

The Activity Service is used by an application to group together a number of units of execution into a single, logical unit of work. The unit of work is preferably a CORBA Object Transaction Service (OTS) transaction or an activity. (CORBA is a registered trademark of OMG Inc.)

As part of the CORBA software structure, the OMG has set forth standards related to a transactions service. The transaction standards are known as the OTS. Further information can be found in "CORBA Object Transaction Service Specification 1.1", available from http://www.omg.org. The standard specifies an interface to a set of transaction services with details of how the service should work and how the service should communicate the presence of the transaction between clients and servers.

Although the Activity Service currently provides useful functions for high-level services, the model also defines strict behaviour with regard to interactions between all activities and transactions when active on the same thread of execution, where an activity represents a context of a high-level service. That is, the current Activity Service model is tightly coupled to the concept of nesting between these components and for some high-level services, these strict interactions or inter-relations with other activities or transactions will not be appropriate.

Therefore, there is a need for an improved framework, whereby high-level services are not so tightly coupled to other components and there is more flexibility in structuring long-running applications and long-running transactional activities.

SUMMARY OF THE INVENTION

Accordingly, in a first aspect, the present invention provides a data processing system comprising: an object framework, and a plurality of components for supporting an application program utilising said plurality of components, said object framework further comprising: means for registering each of said plurality of components with said object framework; means, responsive to said means for registering, for associating each of said plurality of components with one of a plurality of context groups; in which each of said plurality of components comprises means for creating an instance of itself, in which a first instance is associated with a first context group of a first respective component and a second instance is associated with a second context group of a second respective component, in which said first instance and said second instance operate independently of each other.

Preferably, plurality of instances is associated with one context group. Preferably, an instance has an associated context and a plurality of associated contexts may be nested into a context hierarchy. Preferably, where a plurality of associated contexts are nested into a context hierarchy and are associated with one of a plurality of context groups, if a first of the plurality of associated contexts is suspended, then all further plurality of associated contexts are also suspended. Preferably, the further associated contexts are beneath the first associated context in the context hierarchy.

In a preferred embodiment, if the first associated context is resumed, the further associated contexts, which are beneath the first associated context in the context hierarchy, are also resumed. Preferably, in operation, one or more of the plurality of components is a service. Additionally, preferably in operation, one or more of the plurality of components is a transaction. Preferably, a unit of work represents one or more of the plurality of components.

In a preferred embodiment, one of the plurality of context groups is a default context group. Furthermore, preferably, the object framework is a CORBA Activity Service.

In a second aspect, the present invention provides, in a data processing system comprising: an object framework, and a plurality of components for supporting an application program utilising said plurality of components, a method of supporting such an application program, said method comprising the steps of: registering each of said plurality of components with said object framework; in response to said registering, associating each of said plurality of components with one of a plurality of context groups; in which said application program creates an instance of two or more of said plurality of components, in which a first instance is associated with a first context group of a first respective component and a second instance is associated with a second context group of a second respective component, in which said first instance and said second instance operate independently of each other.

In a third aspect, the present invention provides a computer program product for supporting an application program, running in a data processing system, said system comprising an object framework, and a plurality of components for supporting an application program utilising said plurality of components, said computer program product being stored on a computer readable storage medium and comprising instructions which when executed in said data processing system, carry out the steps of: registering each of said plurality of components with said object framework; in response to said registering, associating each of said plurality of components with one of a plurality of context groups; in which said application program creates an instance of two or more of said plurality of components, in which a first instance is associated with a first context group of a first respective component and a second instance is associated with a second context group of a second respective component, in which said first instance and said second instance operate independently of each other.

BRIEF DESCRIPTION OF THE DRAWINGS

The present invention will now be described, by way of example only, with reference to preferred embodiments thereof, as illustrated in the following drawings:

FIG. 2 shows a prior art long-running application comprising a plurality of short duration transactions;

FIG. 3 shows prior art long-running application comprising a plurality of short duration transactions and a plurality of activities;

FIG. 4 shows prior art long-running application comprising a plurality of short duration transactions and a plurality of activities, whereby some of the activities are nested;

DETAILED DESCRIPTION OF A PREFERRED EMBODIMENT OF THE INVENTION

Figure 1:
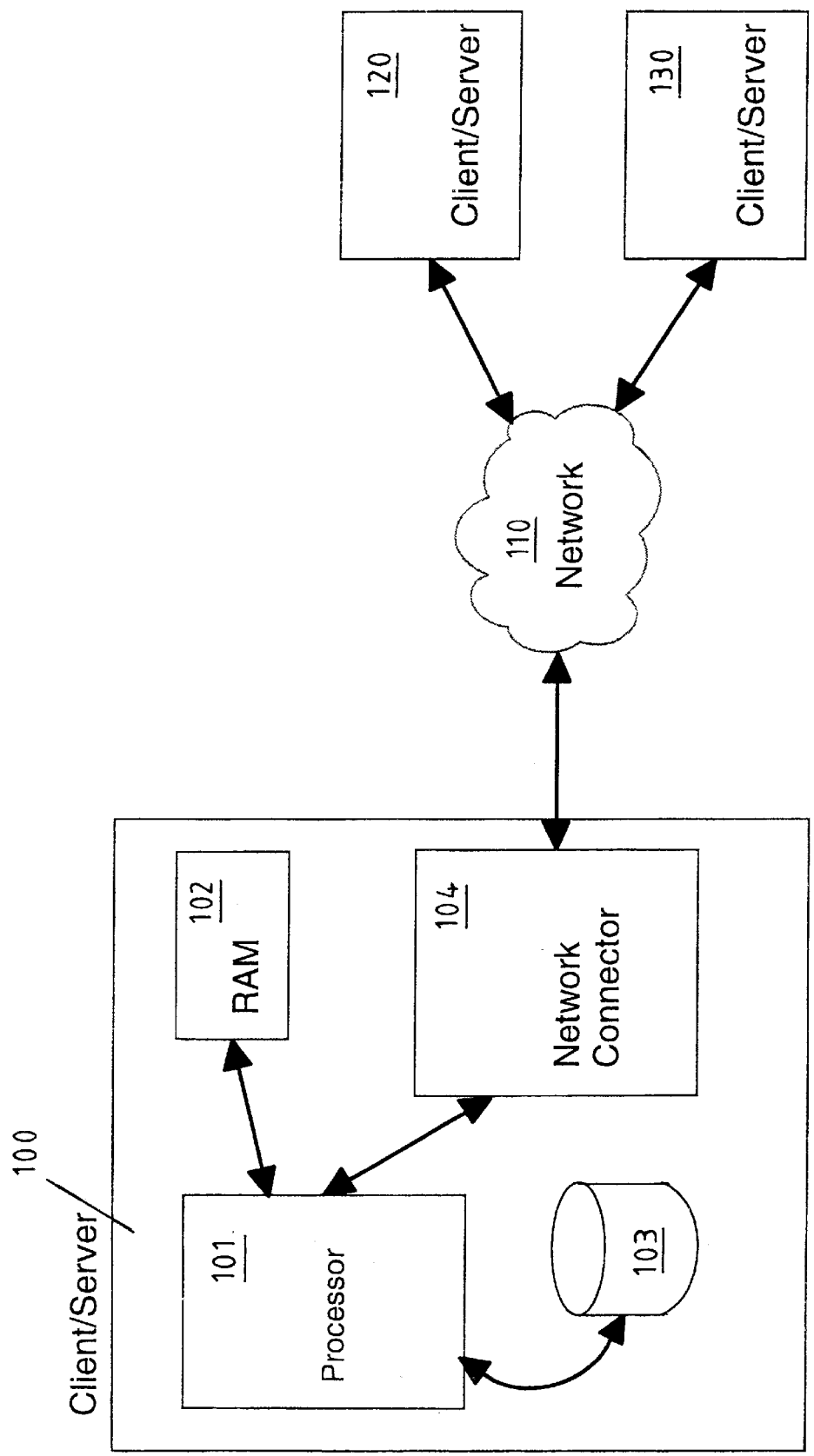
FIG. 1 shows prior art distributed system, in which the present invention may be implemented.
Figure 5:
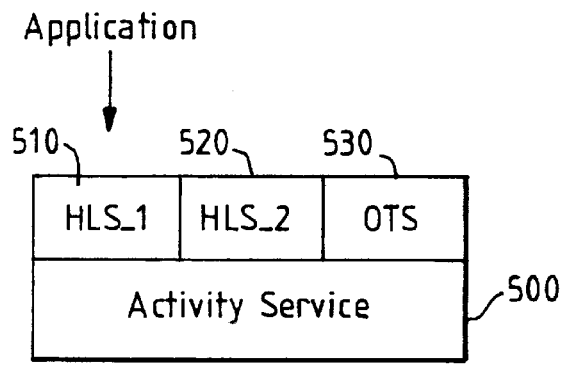
FIG. 5 shows a prior art representation of the relationship between an Activity Service model, high-level services, the Object Transaction Service and an application.
Figure 7:
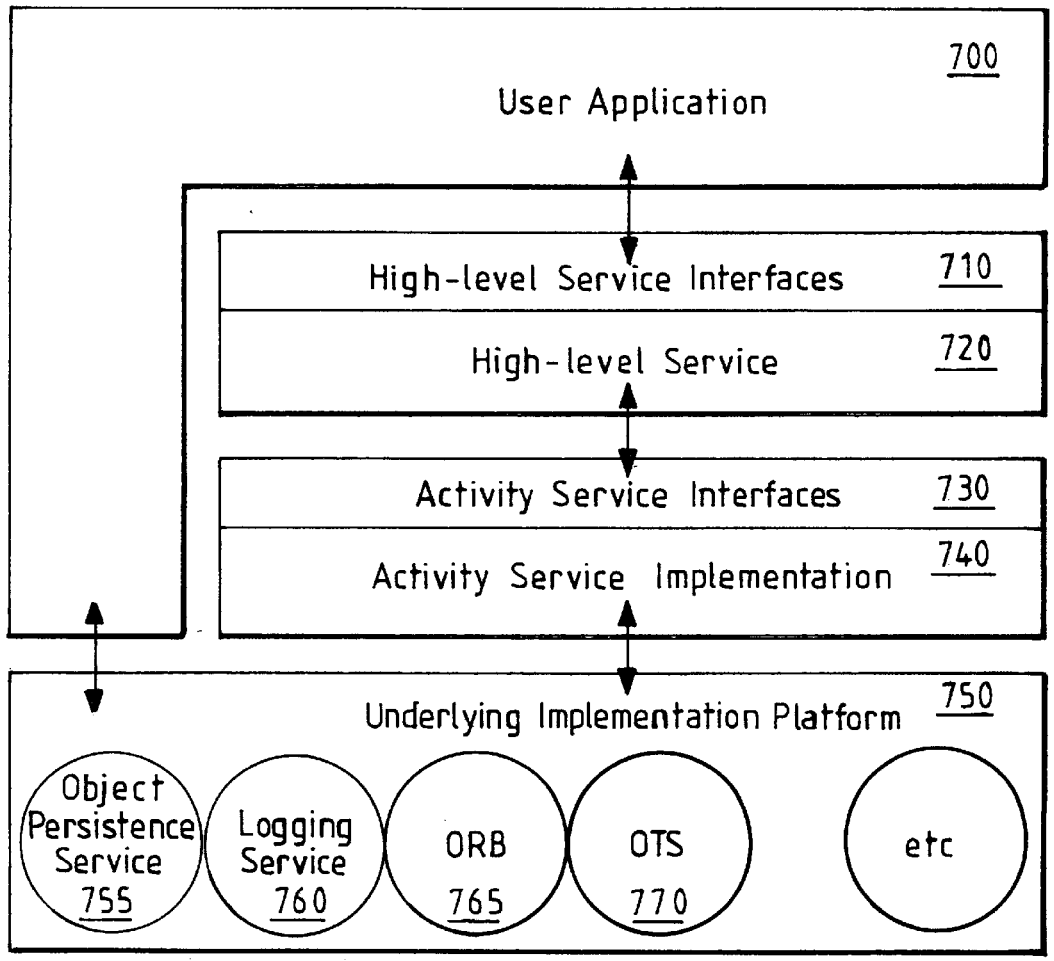
FIG. 7 shows a prior art representation of the system architecture incorporating an Activity Service, in which the present invention may be implemented.
Figure 6:
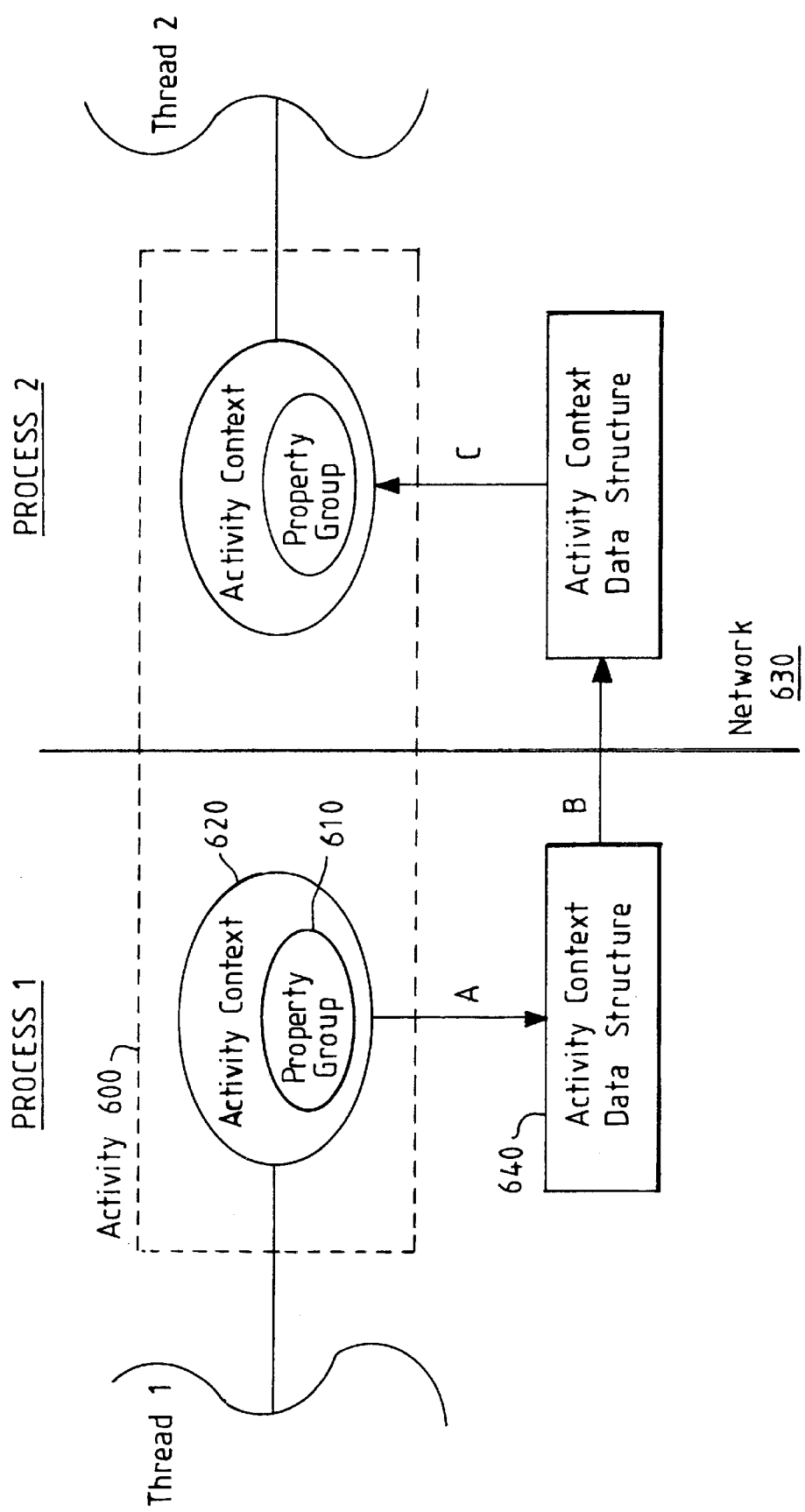
FIG. 6 shows a prior art representation of the process involved in propagating context and property group data.

The present invention is implemented within the Activity Service framework. FIG. 7 depicts a high level view of a system architecture in which the present invention is implemented. The underlying implementation (765), which is an interface that handles a client request for an object, routes the request to an appropriate server that contains the object and then routes the values back to the client. ORB (765) and OTS (770) are mandatory services, however optional services, such as, Object Persistence Service (755) which recovers the state of activities that persist through failure and restart, may be included. Other tools such as Logging Service (760) may also be optionally incorporated.

An activity Service Implementation (740) provides operations via the Activity Service Interfaces (730). The Activity Service Interfaces (730) are utilised by a developer. The current Activity Service (740) allows a user application (700) to manage complex extended transactions. As well as utilising the underlying implementation platform (750), the user application (700) also utilises high-level services (for example (720)) via a high-level service's interface (710). The high-level service interfaces (710) are utilised by an end user. There may be several Activity Service Implementations that inter-operate to allow complex transactions to span a network of transaction systems connected indirectly by an ORB.

Preferably, the present invention is implemented to support the industry standard Enterprise JavaBean programming model. This model is fully defined in the "Enterprise JavaBean 2.0 Specification", available from Sun Microsystems, Inc., included here by reference. Some features of this specification are now described for clarity.

Enterprise Java Beans (EJBs) are user programs and EJB containers provide an execution environment for EJBs. The Enterprise JavaBean 2.0 Specification specifies contracts between clients and containers and between an EJB and its container. Part of the contract between the container and the client is the provision of a home for an EJB to which the client can go to create new EJB instances and to locate existing EJB instances. Part of the contract between an EJB and its container specifies methods that an EJB must implement to enable the container to provide a bean instance with access to container services and to issue notifications to the bean instance. These methods vary according to the type of bean. All calls from a client to methods on the EJB pass through the container code before they can reach the EJB method.

Figure 8:
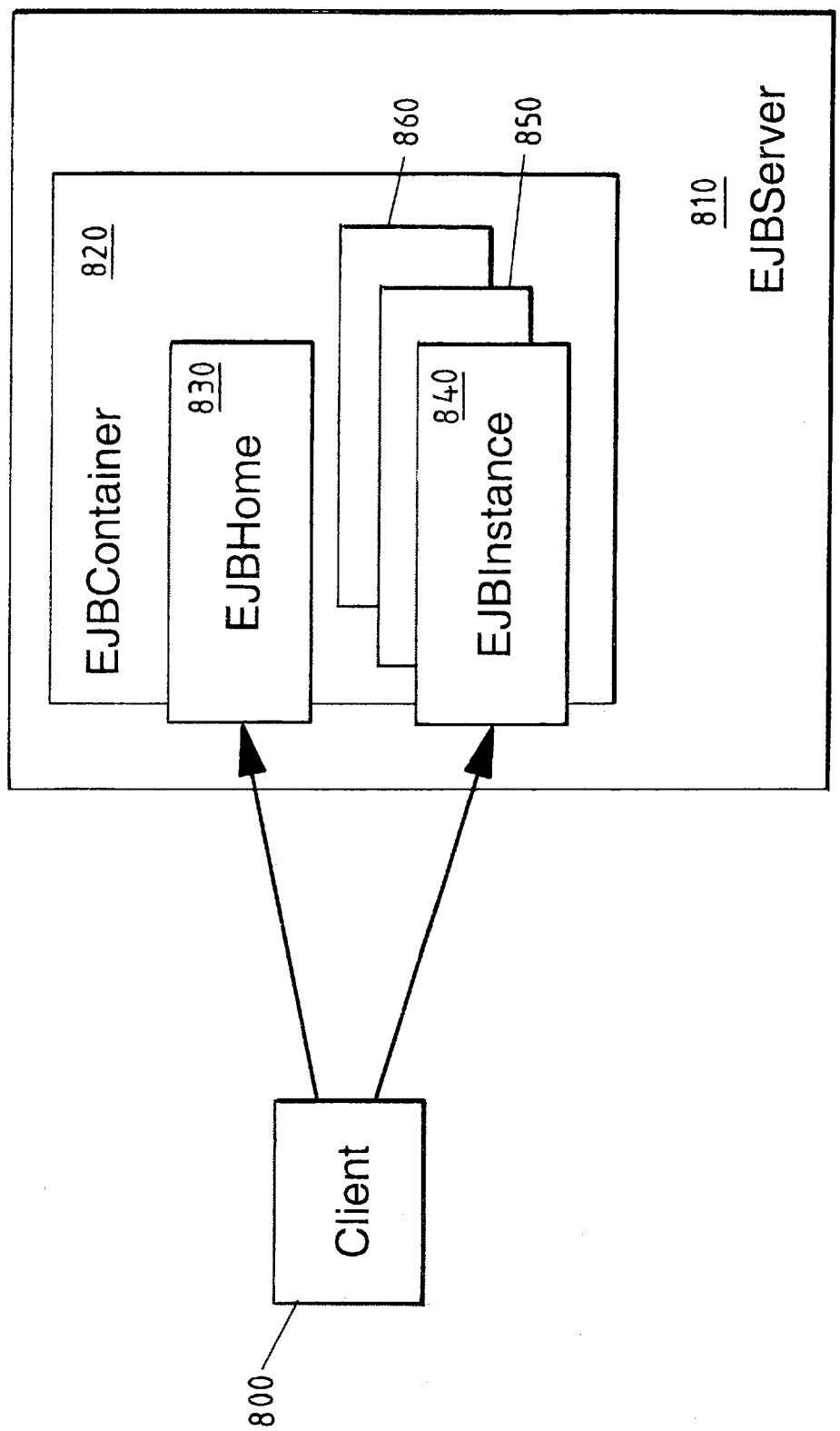
FIG. 8 shows a prior representation of basic components of the Enterprise JavaBean (EJe) programming model.

FIG. 8 is a schematic representation of the EJB programming model described above. It shows an EJB server process (810) that provides an EJB container (820). For each EJB implemented an EJB Home (830) is provided which can be used by a client (800) to create an instance of that EJB (840). The EJB server process (810) may provide homes for many EJB implementations. An EJB instance (840) executes in the environment provided by the EJB container (820) and once an instance has been created, a client (800) can send requests to it. At any moment in time there can be many instances (850,860) of the EJB that might have been created by the same or different clients.

Some of the main components of the current Activity Service utilised by the present invention will be described in more detail below. Referring to contexts, it is important that an operation executes within the correct context. Therefore, when one part of a distributed application invokes a remote operation on another part of a distributed application, the context information must be transmitted between the distributed components. If an activity is transactional, the associated activity context will have knowledge of the relevant transaction context. The value of an activity context is either null, which indicates that the thread has no associated activity, or the value refers to a specific activity.

Another component in the Activity Service is a property. This application-specific information may change over the duration of an application, therefore, there is a need to be able to store the information so that it can be modified without affecting the application. Furthermore, the information may be shared between distributed application components and the way in which the information is stored and accessed may additionally depend on the requirements of the application.

Therefore, the Activity Service utilises a Property Group whereby application-specific data may be made available on a distributed thread of execution. A property group may be associated with each distributed activity and its role is to manage a group of properties. A single activity may be associated with multiple property groups. Activities may be nested arbitrarily deeply, each level encapsulating property groups that may add or over-ride values set by their parent but only for the duration of the nested context.

The Activity Service provides low-level interfaces in support of property groups. Preferably, the interfaces are not used directly by applications, but rather by high-level services built on top of an activity service. Preferably, each high-level service provides its own interface to access property group data. An Activity Service is flexible enough to support an arbitrary number of different high-level services being built on top of it. A high-level service defines its own semantics for managing the objects accessed within its context, for example, visibility rules and recovery guarantees.

Although the Activity Service offers many benefits such as context demarcation and context propagation, the current model is inflexible in some ways. Specifically, there currently exists very strict nesting rules and one example of the inflexibility is that contexts must be strictly nested and cannot overlap.

The nesting rules in the prior art are as follows:

1. An active context that is suspended will cause any nested active child activities and transactions to be suspended.
2. When the active context in (1) is resumed, the nested contexts that were previously suspended are also resumed.
3. When a context is resumed, it must be resumed into the same context hierarchy as that from which it was suspended. This does not have to be on the same thread.

For example, if context_2 is contained within context_1, and context_2 is suspended, then context_2 may be resumed on any thread so long as context_1 is already active on that thread.

4. When a context is ended with a failure, any nested contexts or transactions, whether active or suspended, are marked to fail.
5. If an attempt is made to end an Activity context, then an exception is thrown if the Activity has any nested contexts outstanding, whether active or suspended, and the Activity remains active.

To fully understand the restrictive behaviour of the current model, the structure of an activity will be discussed in more detail. Generally, an activity is represented by an activity object. An activity is created, made to run and then completed. The result of a completed activity is its outcome, the outcome being used to determine subsequent flow of control to other activities. Since activities can run over long periods of time, an activity can be suspended and then resumed at a later point of time in its lifetime.

Suspension and resumption are now discussed with reference to FIG. 9, where the nested activities (910, 920) are completed from the bottom up. Therefore, if Activity_2 (920) is suspended, Activity_1 (910) will not be able to complete successfully until Activity_2 (920) is resumed and completed. Therefore, the restriction with nested contexts is that if a first activity is started on one thread and then a second activity is started on the same thread, the first activity cannot be committed successfully until the second activity has also been completed. There may be some types of high-level service for which this enforced nesting behaviour is not required. It should be understood that when a transaction is suspended, other distributed components are not necessarily suspended. However, this functionality could be implemented if desired.

Figure 10:
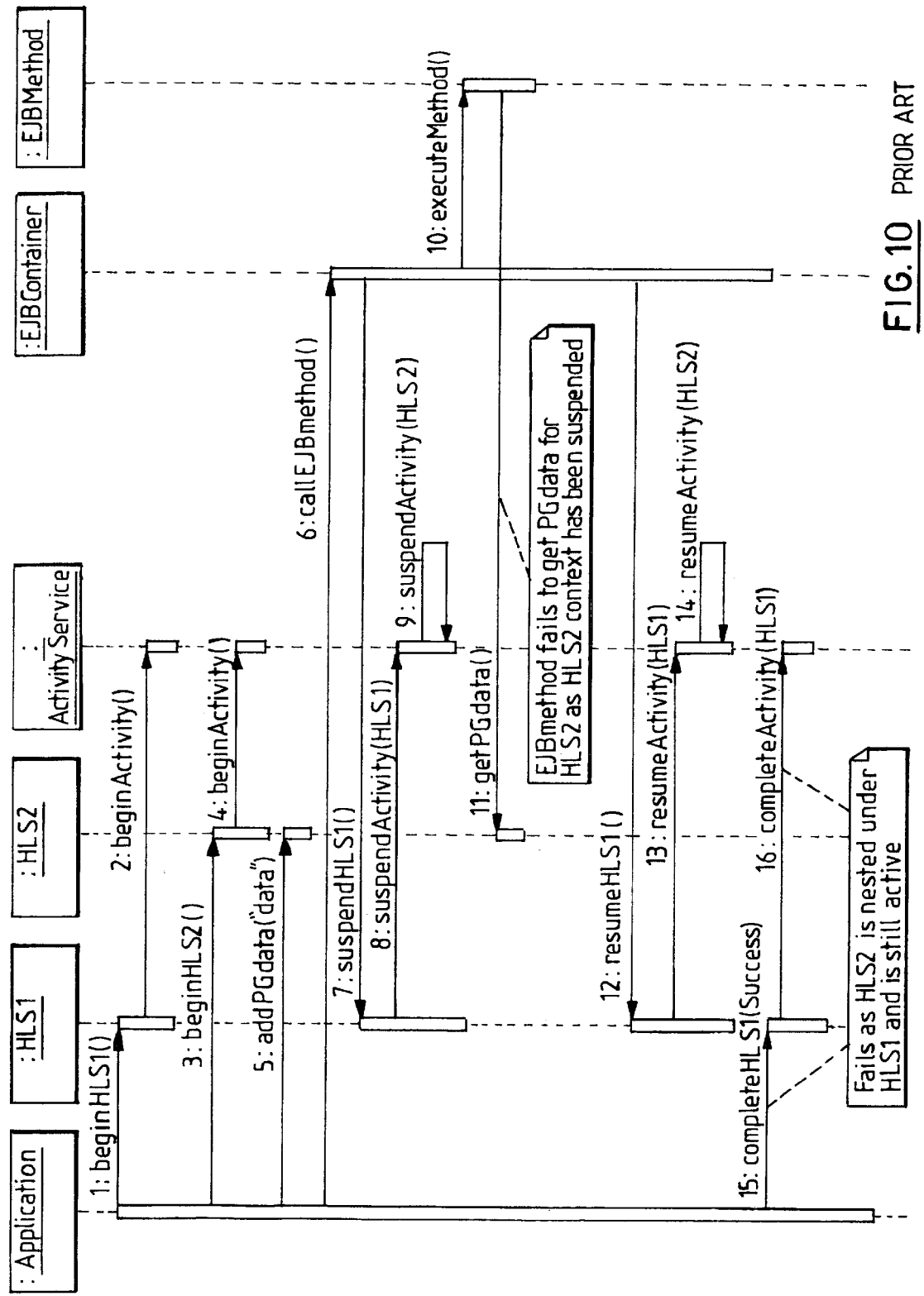
FIG. 10 shows a prior art sequence diagram of the flows involved between components of the EJB and Activity Service.

In another example, referring to FIG. 10, an application utilises two high-level services, HLS1 and HLS2. The application calls an EJB method, which has an associated policy. The associated policy causes any context associated with HLS1 to be suspended before the EJB method runs. Likewise the associated policy causes any context associated with HLS1 to be resumed when the EJB method completes. EJB container policies manage the associated policies of the EJB method. The EJB container can make calls on HLS1 to suspend and resume HLS1 contexts.

Referring to FIG. 10, the sequence flows involved in the prior art and identified by numerals will now be described in more detail:

1. The application begins the HLS1 context.
2. HLS1 is implemented on the Activity Service and therefore begins an activity context.
3. The application begins the HLS2 context.
4. HLS2 is also implemented on the Activity Service and therefore begins an activity context. The Activity Service nests the context for HLS2 as a child of the context for HLS1.
5. The application sets some Property Group data in the HLS2 context.
6. The application invokes an EJB method; such calls go via the EJB container code.
7. The function of the EJB container policy for this EJB method is to suspend the HLS1 context.
8. HLS1 therefore suspends its activity context.
9. Since the HLS2 context is a nested child context of HLS1, the Activity Service also suspends the HLS2 context.
10. The EJB container now invokes the EJB method.
11. The EJB method tries to access the HLS2 Property Group data that was set by the application. However, since the HLS2 context has been suspended from the thread of execution, it is not available to the EJB method and therefore this call fails.
12. After the EJB method completes, the EJB container resumes the HLS1 context.
13. HLS1 now resumes its activity context.
14. The Activity Service resumes nested context HLS2 under the HLS1 context
15. The application tries to complete the HLS1 context.
16. HLS1 tries to complete its activity context, however, this fails because the HLS2 context is nested under HLS1 and has not yet been completed.

The present invention increases flexibility within the Activity Service framework by allowing a high-level service or transaction to specify which other high-level services or transactions, if any, it wishes to interact with. In a preferred implementation of the present invention, extensions to the standard interface of an Activity Service are provided so that a high-level service or transaction can indicate access to a particular "context group" in which it wishes to participate. Preferably, when the present invention is implemented, a context group is held in memory as a string. It should be understood that a context group could contain one or more of the high-level services or transaction.

Figure 11:
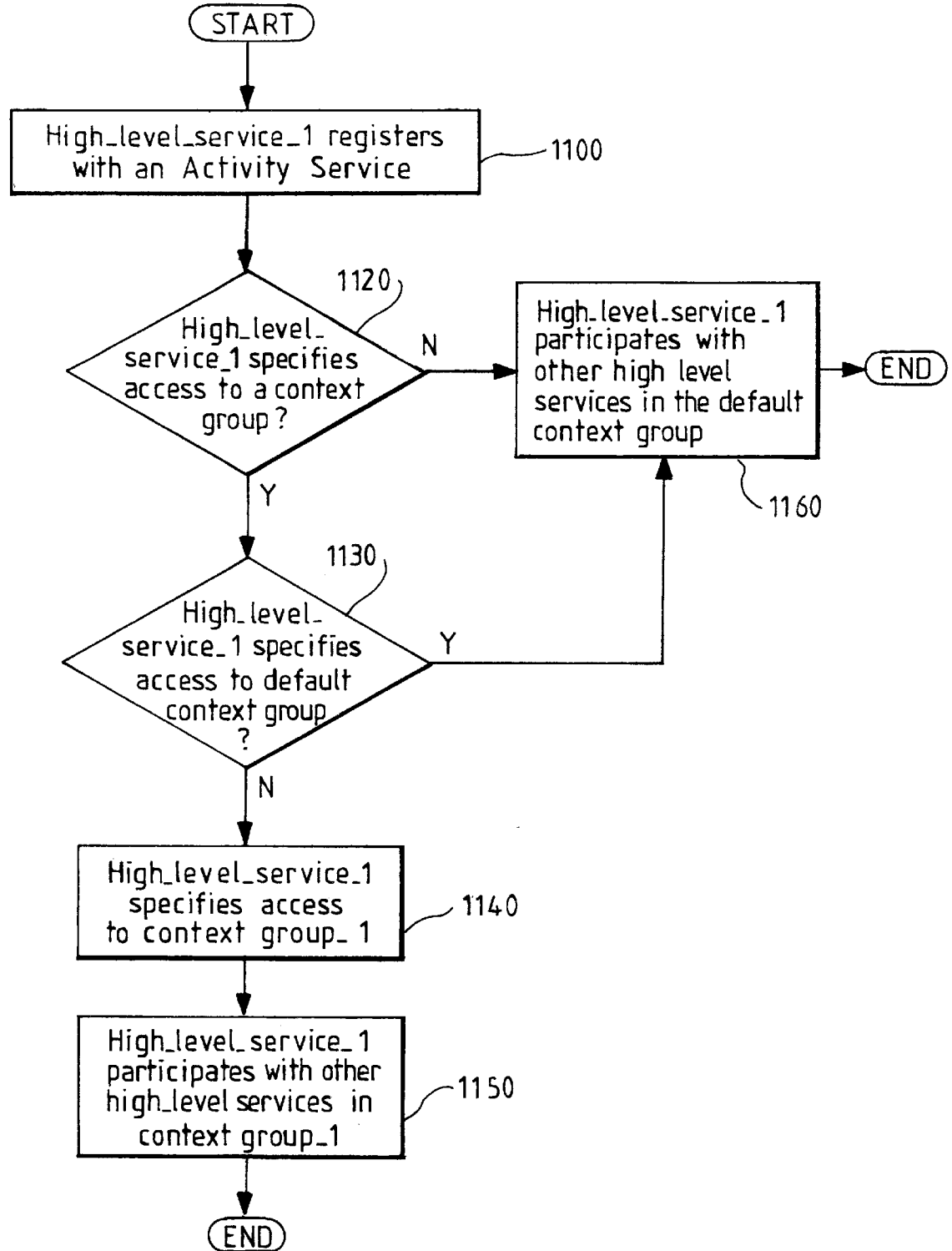
FIG. 11 is a flow chart showing the operational steps involved in specifying and participating within a context group, according to the present invention.

Referring to FIG. 11, the present invention will now be described with reference to a high-level service as an example. When a high-level service registers (step 1100)

with the Activity Service, a context group can be specified (step 1120). Preferably, a high-level service can specify access to either a default context group or a further context group. If a high-level service does not specify access to a particular context group, it will be given access to the default context group. All high-level services that specify the same context group are logically grouped together by the Activity Service.

Figure 12:
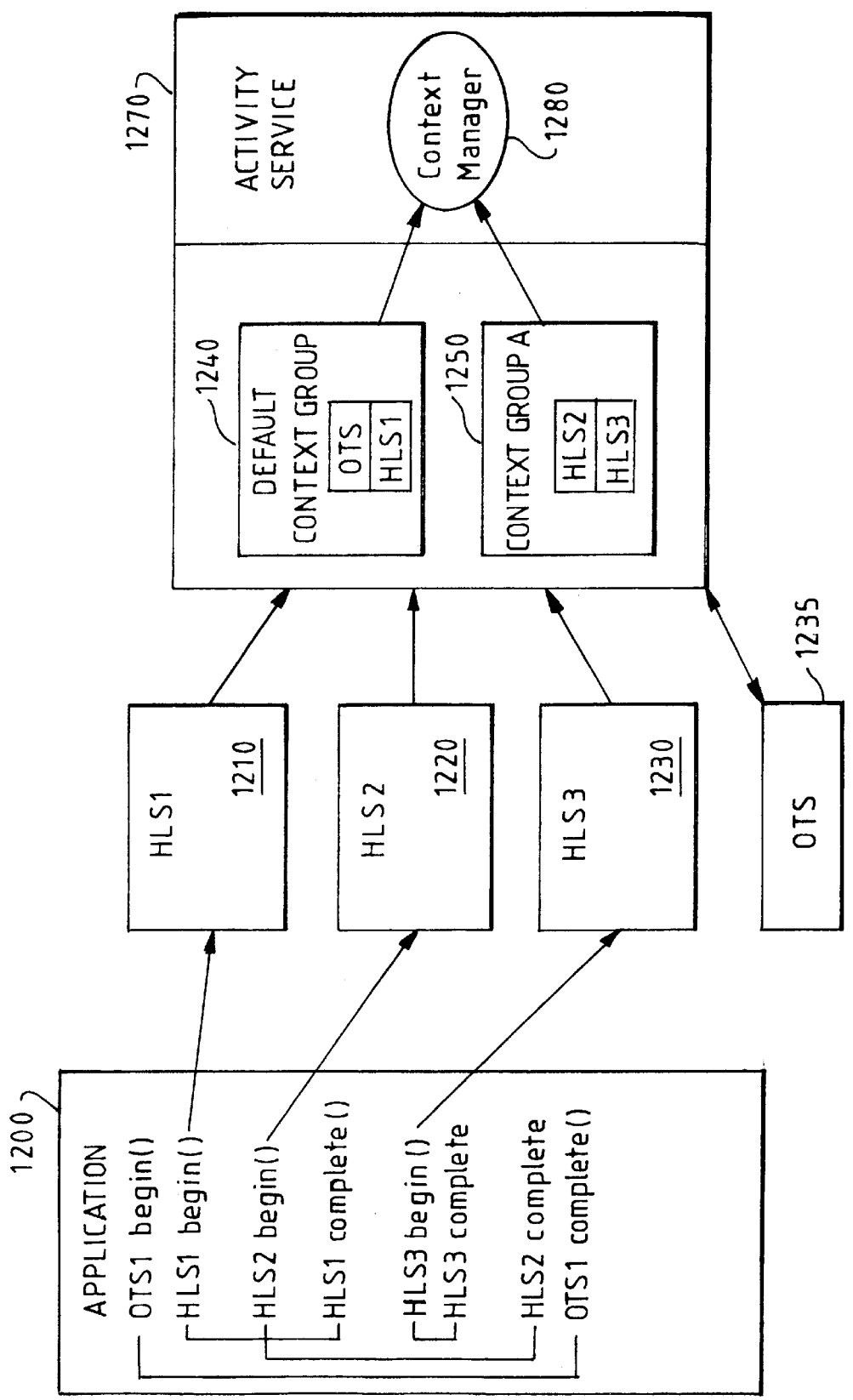
FIG. 12 shows an overview of the components involved in FIG. 11.

This process is discussed in more detail by referring now to FIG. 12, which is to be used in conjunction with FIG. 11. Supposing a high-level service does not specify access to a particular context group (negative result to step 1120), or if the high-level service specifies access to the default context group (positive result to step 1130). That high-level service will interact and be co-operatively managed with other activities and transactions in the default group (step 1160).

In FIG. 12, a high-level service HLS1 (1210) is utilised by an application (1200). HLS1 (1210) specifies access to a default context group (1240) and since the OTS (1235) also specifies access to the default context group (1240), HLS1 (1210) need only interact with the OTS (1235).

If a high-level service specifies (step 1140) access to a further context group, that high-level service will only interact (step 1150) with other high-level services participating in the same context group. Examples of interactions include suspension and resumption. Referring to FIG. 12, high-level services HLS2 (1220) and HLS3 (1230) are also utilised by the application (1200). These high-level services (1220,1230) specify access to a context group "A" (1250). This allows the high-level services (1220,1230) to participate only with each other.

Furthermore, a high-level service in one context group will operate and be controlled independently of other high-level services in a different context group, on the same thread of execution. Therefore, in FIG. 12, HLS1 (1210) in the default context group (1240) operates independently of HLS2 (1220) and HLS3 (1230) in context group "A" (1250). If this functionality was not provided by the present invention, referring to the application (1200), HLS2 (1220) would be dependent on HLS3 (1230) which is nested within HLS2 (1220) and HLS1 (1210) would be dependent on HLS2 (1220) which is nested within HLS1 (1210). By providing context group functionality, HLS1 (1210) need not wait for HLS2 (1220) and HLS3 (1230) to commit successfully, before it too may complete.

Figure 9:
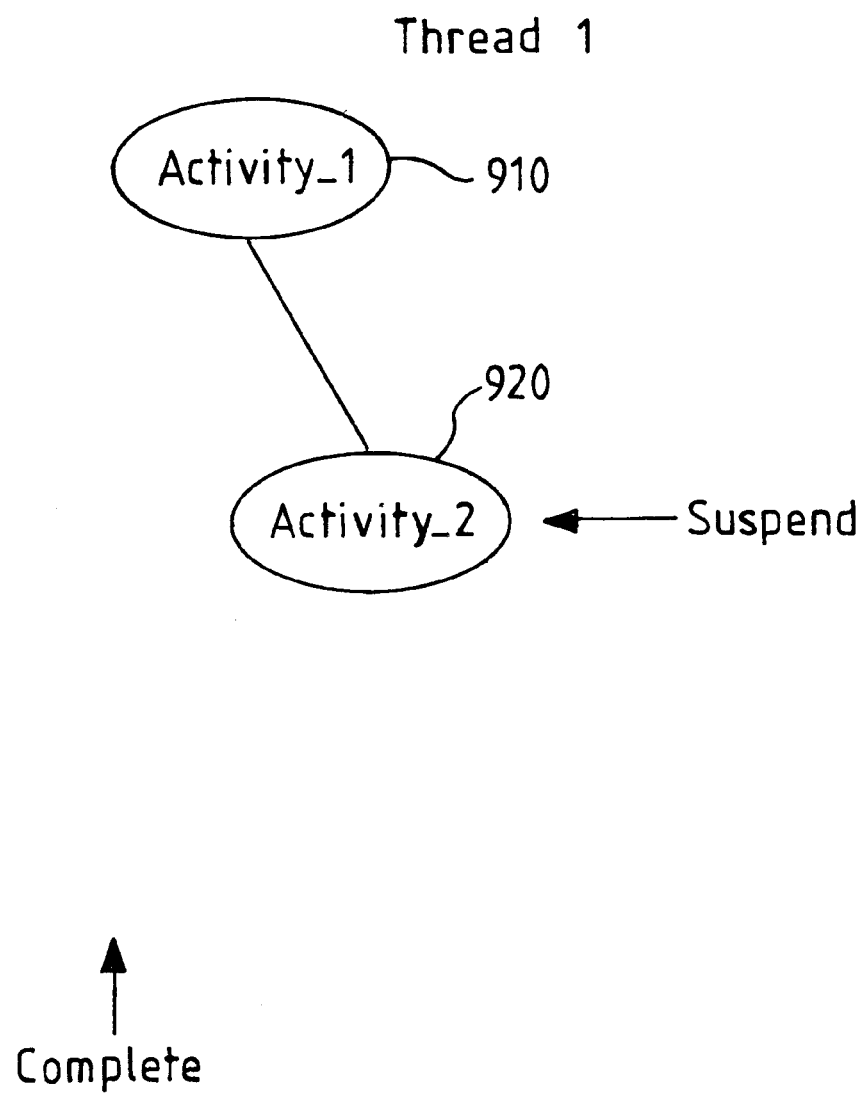
FIG. 9 shows a prior art representation of the suspension process for activities.
Figure 13:
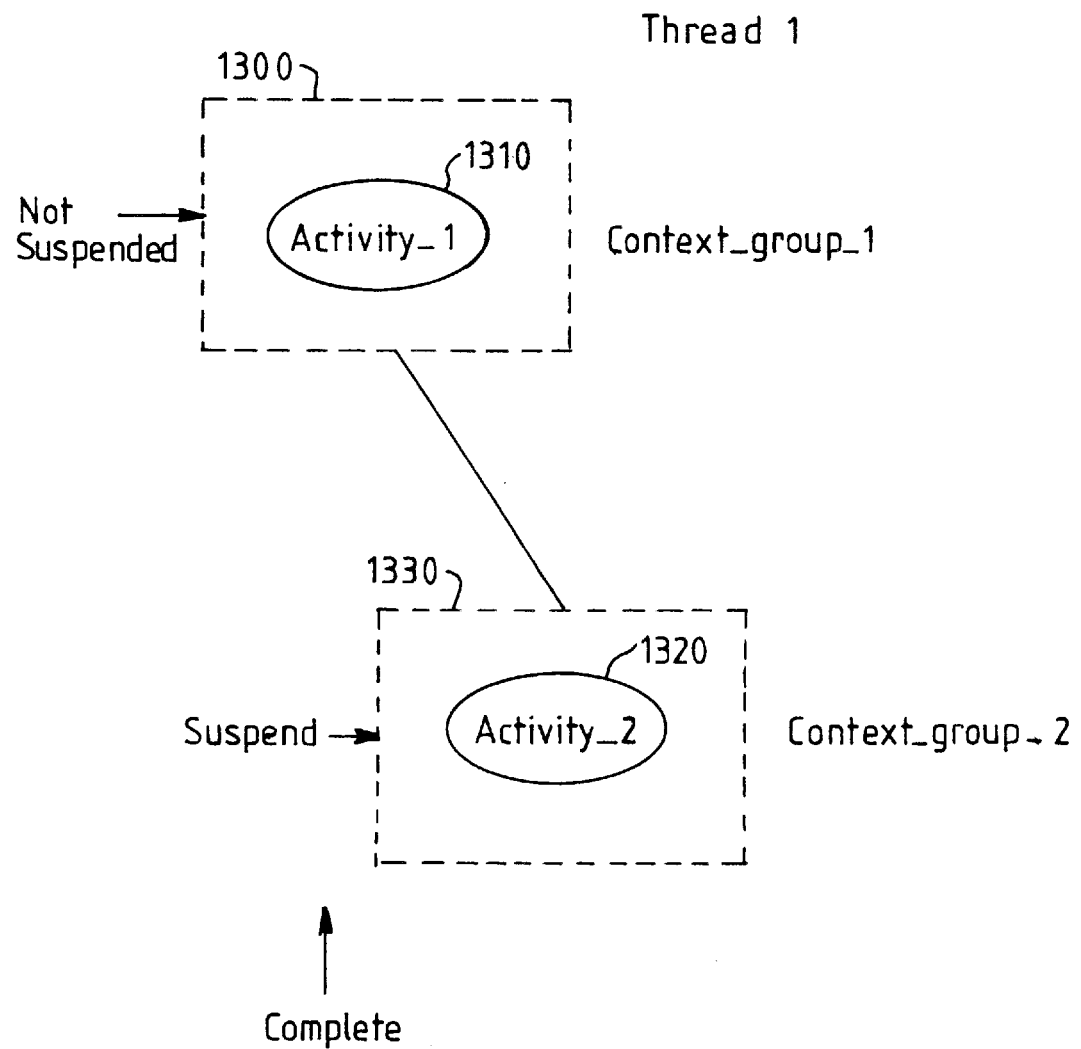
FIG. 13 shows an improvement over the suspension process for activities of FIG. 9, according to the present invention.

Using the example in FIG. 9, with reference to FIG. 13, if Activity_2 (1320) is suspended, Activity_1 (1310) will be able to complete even if Activity_2 (1320) is not resumed. This is because Activity_1 (1310) is in context_group_1 (1300) and therefore operates independently of other activities (1320) in context_group_2 (1330) on the same thread.

Figure 14:
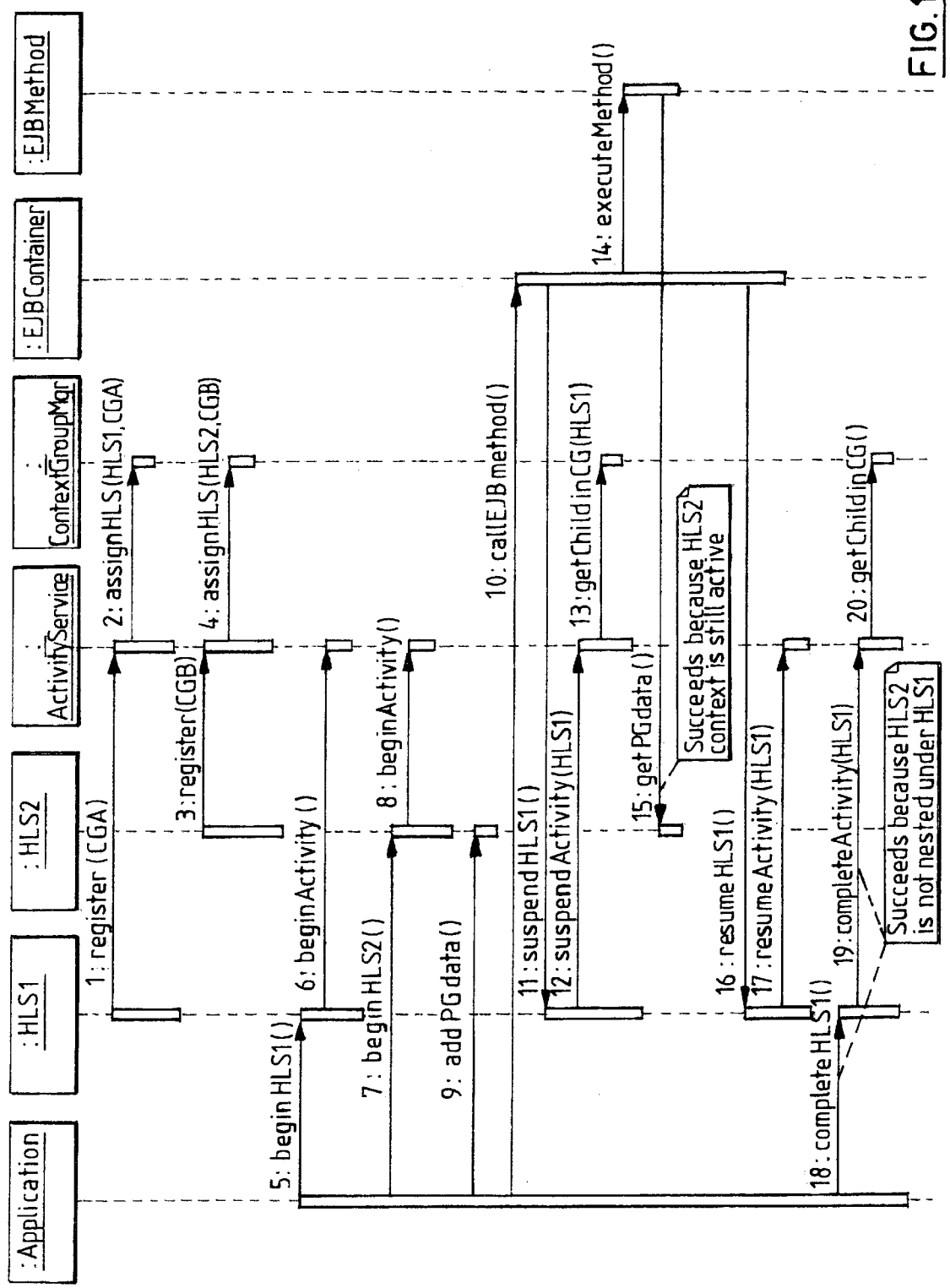
FIG. 14 shows an improvement over the sequence diagram of the flows involved between components of the EJB and Activity Service of FIG. 10, according to the present invention.

Using the example in FIG. 10, with reference to FIG. 14, the sequence flows of the present invention will now be described in more detail:

1. HLS1 registers with the Activity Service. On doing so, it specifies the string "CGA" as its context group.
2. The Activity Service utilises a context group manager in order to associate HLS1 with context group "CGA".
3. HLS2 registers with the Activity Service. On doing so it specifies the string "CGB" as its context group.
4. The Activity Service utilises the context group manager to associate HLS2 with context group "CGB"
5. The application begins the HLS1 context.
6. HLS1 is implemented on the Activity Service and therefore begins an activity context.
7. The application begins the HLS2 context.
8. HLS2 is also implemented on the Activity Service and therefore begins an activity context.
9. The application sets some Property Group data in the HLS2 context.
10. The application invokes an EJB method; such calls go via the EJB container code.
11. The function of the EJB container policy for this EJB method is to suspend the HLS1 context.
12. HLS1 therefore suspends its activity context.
13. The Activity Service utilises the context group manager to determine whether there is a nested child context that is to be suspended. In this case the HLS2 context is in a different context group to HLS1. Therefore, there is no nested child for the HLS1 context. The HLS2 context therefore remains active on the thread.
14. The EJB container now invokes the EJB method.
15. The EJB method tries to access the HLS2 Property Group data that was set by the application. Since the HLS2 context is active on the thread of execution, the Property Group data is available to the EJB method, and therefore this call succeeds.
16. After the EJB method completes, the EJB container resumes the HLS1 context.
17. HLS1 now resumes its activity context
18. The application tries to complete the HLS1 context
19. HLS1 tries to complete its activity context
20. The Activity Service utilises the context group manager to determine whether there is a nested child context for the HLS1 context. In this case since HLS1 and HLS2 are in different context groups, there is no nested child for HLS1 and therefore HLS1 is allowed to complete successfully.

Preferably, two (or more) different high-level service or transaction implementations may co-operate in nesting. For example, if a first high-level service nests its context with a context of a second high-level service, both high-level services are required to declare that they are a part of the same context group.

Thus, the utilisation of context groups will allow high-level services or transactions, which do not need to interact with other high-level services or transactions, to make use of the Activity Service. High-level services or transactions can therefore have their own container policies and be administered independently of any other components in other context groups. Therefore, the present invention is advantageous in that the Activity Service keeps within the broad specification as defined by the OMG, whilst also removing the restrictive and strict behaviour of the current Activity Service.

Referring back to FIG. 12, preferably, a context manager (1280) is an object that maintains the context groups (1240, 1250) and is used for example when contexts need to be associated or disassociated with a thread of execution. The context manager maintains a map for each context group in order to effect context nesting rules. Preferably, the rules described below are utilised with the present invention:

1. An active context that is suspended will cause any nested active child contexts in the same context group to be suspended.
2. When the active context in (1) is resumed, the nested contexts that were previously suspended are also resumed.
3. When a context is resumed, it must be resumed into the same context hierarchy as that from which it was suspended. This does not have to be on the same thread.

4. When a context is ended with a failure, any nested contexts in the same context group, whether active or suspended, are marked to fail.
5. If an attempt is made to end a context, then an exception is thrown if the context has any nested contexts in the same context group outstanding, whether active or suspended, and the context remains active.

It should be noted that the preferred embodiment uses a CORBA compliant OTS transaction as a way of denoting a unit of work. However, the present invention can also be applied to other types of unit of work such as different types of transaction, a business method, or any other way of grouping a sequence of events into a unit.

What is claimed is:

1. A data processing system comprising: an object framework, and a plurality of components for supporting an application program utilising said plurality of components, said object framework further comprising:
   means for registering each of said plurality of components with said object framework;
   means, responsive to said means for registering, for associating each of said plurality of components with one of a plurality of context groups;
   in which each of said plurality of components comprises means for creating an instance of itself, in which a first instance is associated with a first context group of a first respective component and a second instance is associated with a second context group of a second respective component, in which said first instance and said second instance operate independently of each other.

2. A data processing system as claimed in claim 1, in which a plurality of instances are associated with one context group.

3. A data processing system as claimed in claim 2, whereby an instance has an associated context, in which a plurality of associated contexts may be nested into a context hierarchy.

4. A data processing system as claimed in claim 3, whereby a plurality of associated contexts are nested into a context hierarchy and are associated with one of a plurality of context groups, in which if a first of said plurality of associated contexts is suspended, all further plurality of associated contexts, beneath said first of said plurality of associated contexts in said context hierarchy, are also suspended.

5. A data processing system as claimed in claim 4, in which if said first of said plurality of associated contexts is resumed, said all further plurality of associated contexts, beneath said first of said plurality of associated contexts in said context hierarchy, are also resumed.

6. A data processing system as claimed in claim 1, in which, in operation, one or more of said plurality of components is a service.

7. A data processing system as claimed in claim 1, in which, in operation, one or more of said plurality of components is a transaction.

8. A data processing system as claimed in claim 1, in which one or more of said plurality of components is represented by a unit of work.

9. A data processing system as claimed in claim 1, in which one of said plurality of context groups is a default context group.

10. A data processing system as claimed claim 1, in which said object framework is a CORBA Activity Service.

11. In a data processing system comprising: an object framework, and a plurality of components for supporting an application program utilising said plurality of components, a method of supporting such an application program, said method comprising the steps of:
   registering each of said plurality of components with said object framework;
   in response to said registering, associating each of said plurality of components with one of a plurality of context groups;
   in which said application program creates an instance of two or more of said plurality of components, in which a first instance is associated with a first context group of a first respective component and a second instance is associated with a second context group of a second respective component, in which said first instance and said second instance operate independently of each other.

12. A method as claimed in claim 11, in which one or more instances are associated with a context group.

13. A method as claimed in claim 12, whereby an instance has an associated context, in which a plurality of associated contexts may be nested into a context hierarchy.

14. A method as claimed in claim 13, whereby a plurality of associated contexts are nested into a context hierarchy and are associated with one of a plurality of context groups, in which if a first of said plurality of associated contexts is suspended, all further plurality of associated contexts, beneath said first of said plurality of associated contexts in said context hierarchy, are also suspended.

15. A method as claimed in claim 14, in which if said first of said plurality of associated contexts is resumed, said all further plurality of associated contexts, beneath said first of said plurality of associated contexts in said context hierarchy, are also resumed.

16. A method as claimed in claim 11, in which, in operation, one or more of said plurality of components is a service.

17. A method as claimed in claim 11, in which, in operation, one or more of said plurality of components is a transaction.

18. A method as claimed in claim 11, in which one or more of said plurality of components is represented by a unit of work.

19. A method as claimed in claim 11, in which one of said plurality of context groups is a default context group.

20. A method as claimed in claim 11, in which said object framework is a CORBA Activity Service.

21. A computer program product for supporting an application program, running in a data processing system, said system comprising an object framework, and a plurality of components for supporting an application program utilising said plurality of components, said computer program product being stored on a computer readable storage medium and comprising instructions which when executed in said data processing system, carry out the steps of:
   registering each of said plurality of components with said object framework;
   in response to said registering, associating each of said plurality of components with one of a plurality of context groups;
   in which said application program creates an instance of two or more of said plurality of components, in which a first instance is associated with a first context group of a first respective component and a second instance is associated with a second context group of a second respective component, in which said first instance and said second instance operate independently of each other.

* * * * *